Sept. 21, 1954  D. HITCHCOCK ET AL  2,689,619
CLUTCH RELEASE MECHANISM FOR TRACTORS
Filed May 17, 1952

INVENTORS
DELBERT HITCHCOCK
& NOBLE E. HITCHCOCK
BY
RICHEY, WATTS, EDGERTON & McNENNY
ATTORNEYS

Patented Sept. 21, 1954

2,689,619

UNITED STATES PATENT OFFICE 2,689,619

CLUTCH RELEASE MECHANISM FOR TRACTORS

Delbert Hitchcock, Wooster, and Noble E. Hitchcock, Lakeville, Ohio

Application May 17, 1952, Serial No. 288,424

3 Claims. (Cl. 180—14.5)

1

This invention relates to improvements in the draft gear for farm tractors, and more specifically to mechanism to arrest the translation of the vehicle when the plow share on a drawn implement strikes an obstruction.

The primary object of the invention is to provide linkage for releasing the clutch in a tractor upon actuation of the top arm in a three-point hitch-type draw bar.

Further objects of the invention reside in the provision of linkage that is economic of manufacture, efficient of operation, and susceptible of installation on a tractor without structural modification thereof.

Other objects and advantages, more or less ancillary to the foregoing, and the manner in which all the various objects are realized will appear in the following description, which, considered in connection with the accompanying drawings, sets forth the preferred embodiment of the invention.

Referring to the drawings.

Figure 1:
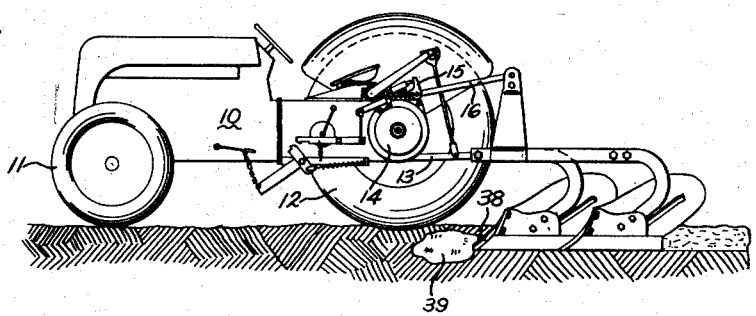
Fig. 1 is a side elevational view of a tractor coupled with a plow draw bar embodying the present invention.
Figure 2:
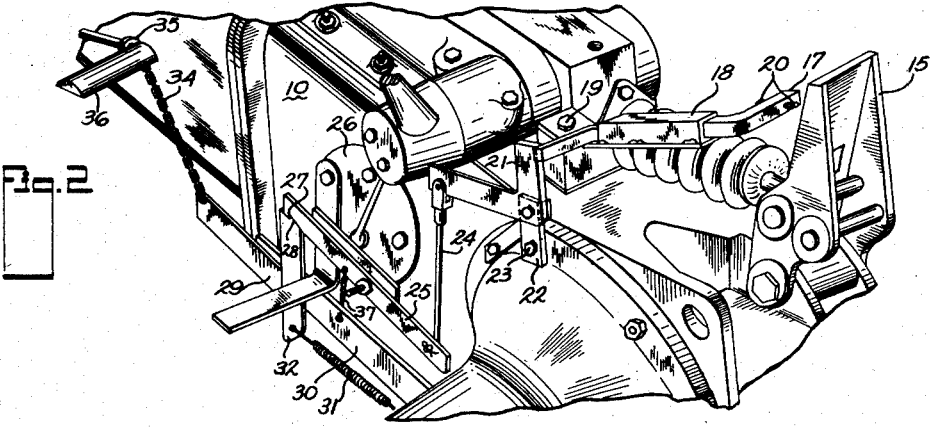
Fig. 2 is a view in perspective of a fragmentary portion of the improved tractor clutch release mechanism.
Figure 3:
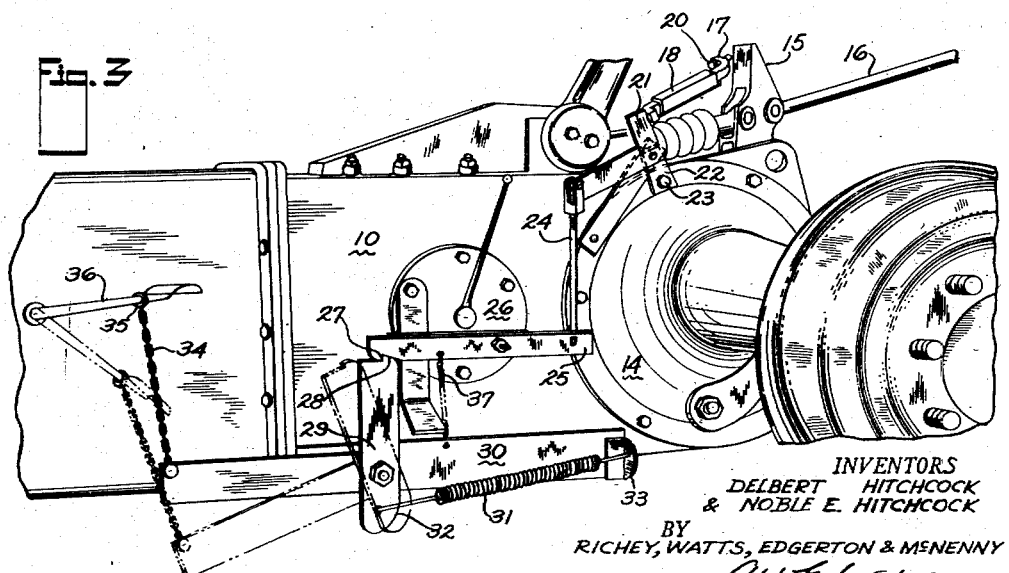
Fig. 3 is another view in perspective of the improved linkage.

Referring first to Fig. 1, the clutch release mechanism is designed for assembly upon a farm tractor of a well-known form which embodies, as a unitary structure, a motor and transmission casing 10, dirigible front wheels 11, drive wheels 12, and a three-point hitch draw bar 13 mounted on opposed sides of the rear axle differential housing 14 and coupled with a shock link 15 through the top arm 16.

The clutch release mechanism comprises a push rod 17 of rectangular transverse section supported for free lineal movement in a square tubular bracket 18 affixed to the transmission housing by one of the studs 19 therein. The end of the push rod that protrudes beyond the outer end of the tubular section of the bracket is bent for abutting engagement with the shock link 15, the central portion of the bent end thereof being drilled and tapped for the reception of a set screw 20 for adjusting the translation of the rod. The inner end of the push rod is bent at right angles to the body thereof for engagement with the upper arm of a bell crank 21 fulcrumed on a bracket 22 anchored on the rear axle bell housing by one of the studs 23 therein. The lower arm of the bell crank is coupled for pivotal

2 movement with a link 24 formed from a rod having a yoke threaded upon the upper end thereof to accommodate adjustment of a lever 25 pivoted intermediate its ends upon a cap screw in a transmission cover plate 26. The opposed end of the lever 25 is notched to provide a shoulder 27 designed for engagement with a lip 28 in the upper end of a bell crank 29. The bell crank is fulcrumed on a plate 30 secured to the transmission case 10 by the bolts in the flanged base thereof. The upper arm of the bell crank 29 is urged forwardly by a contractile spring 31 connected at one end to a lug 32 depending from the vertical arm of the bell crank and secured at its other end in a bracket 33 mounted on the plate 30. The outer end of the lower arm of the bell crank 29 is drilled for the reception of a chain 34 which is coupled through a ring 35 to the clutch pedal 36. The forward end of the lever 25 is provided with a spring 37 mounted to maintain the shoulders 27 and 28 of the latch mechanism in interengaged relation when the pedal 36 is elevated in its normal clutch-engaged position.

In operation, when the plow share 38 strikes an obstruction such as the boulder 39 illustrated in Fig. 1, the draw bar 13 will rock about its pivotal connection on the axle causing a forwardly tilting movement of the top arm 16 and consequent lineal translation of the push rod 17. As the inner end of the push rod abuts the bell crank 21, the lower arm thereof will force the link 24 downwardly, thus rocking the lever 25 about its fulcrum and effectuating the elevation of its forward end and separation of the shouldered elements 27 and 28 of the latch. As the bell crank 29 is released, the lower arm thereof will be depressed by the spring 31 which is designed to outweigh the clutch spring (not shown) and effect the disengagement of the driving element in the transmission with the engine.

Bearing in mind that the translation of the vehicle is relatively slow and that the momentum thereof is nil when the plows are in their operative position, it will be recognized that the vehicle will be brought to rest instantaneous the separation of the clutch member with the source of power. Thus, as found in practice, the improved clutch release mechanism will arrest the movement of the vehicle before the plow share or parts appurtenant thereto are damaged. The operation of the linkage is free and independent of the operator of the vehicle, whose reflexes would be too slow to circumvent damage if the clutch operation were left to him.

After the vehicle is stopped, the latch mechanism may be reset by rocking the bell crank 29 upwardly and interlocking the latch with the lever 25; thereafter the vehicle may be manipulated to clear the boulder, or facilitate the removal thereof.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

We claim:

1. In combination with the top arm of a three-point hitch tractor draw bar, mechanism for releasing the tractor clutch upon actuation of said top arm comprising a push rod supported for axial movement on a tractor and disposed in abutting engagement with a draw bar top arm, a bell crank pivoted on the tractor having one end thereof engaged with said push rod, a lever fulcrumed on the tractor subjacent said bell crank, a link coupled therewith and with the other end of the bell crank, said lever having a shoulder in the free end thereof, a second bell crank fulcrumed on the tractor subjacent the lever, one end thereof being interengaged with the shoulder in said lever, a chain coupled with the other end of the second bell crank and with a clutch pedal on the tractor and a contractile spring mounted on the tractor normally urging the end of the second bell crank downwardly into clutch-released position.

2. A clutch control for a tractor having a three-point hitch tractor drawbar with a movable top arm, mechanism for releasing the tractor clutch upon actuation of said top arm comprising a push rod slidably mounted for axial movement on a tractor, and having a laterally disposed arm in abutting engagement with the drawbar top arm, a bell crank pivotally mounted on the tractor rotatable on a horizontal axis and having one end vertically disposed for abutting engagement with a second lateral arm on said push rod, a lever fulcrumed on the tractor subjacent said bell crank, a link joining one end of said lever and the other end of the bell crank, a shoulder formed on the end of said lever opposite said link, a second bell crank fulcrumed on the tractor subjacent the lever, a complementary shoulder formed on one end of the second bell crank for engagement with the shoulder on the lever, a chain coupling the other end of the second bell crank and a clutch pedal on the tractor, said chain being normally slack, a depending ear on said second bell crank subjacent the fulcrum therefor, and a contractile spring having one end anchored on the tractor and the other end coupled with the depending ear, said spring normally urging the second bell crank into a clutch-released position when said mechanism is actuated by said top arm.

3. A clutch control for a tractor having a three-point hitch tractor drawbar with a movable top arm, mechanism for releasing the tractor clutch upon actuation of said top arm comprising a push rod slidably mounted for axial movement on a tractor, and having a laterally disposed arm in abutting engagement with the drawbar top arm, a bell crank pivotally mounted on the tractor rotatable on a horizontal axis and having one end vertically disposed for abutting engagement with a second lateral arm on said push rod, a lever fulcrumed on the tractor subjacent said bell crank, a link joining one end of said lever and the other end of the bell crank, a shoulder formed on the end of said lever opposite said link, a second bell crank fulcrumed on the tractor subjacent the lever, a complementary shoulder formed on one end of the second bell crank for engagement with the shoulder on the lever, a spring biasing said lever toward the second bell crank, a chain coupling the other end of the second bell crank and a clutch pedal on the tractor, said chain being normally slack, a depending ear on said second bell crank subjacent the fulcrum therefor, and a contractile spring having one end anchored on the tractor and the other end coupled with said depending ear, said spring normally urging the second bell crank into a clutch-released position when said mechanism is actuated by said top arm.

References Cited in the file of this patent

UNITED STATES PATENTS

| Number | Name | Date |
|--------|------|------|
| 1,365,299 | Blumberg | Jan. 11, 1921 |
| 1,498,752 | Reed | June 24, 1924 |
| 2,240,657 | Lokken | May 6, 1941 |
| 2,294,188 | Kuntz | Aug. 25, 1942 |

FOREIGN PATENTS

| Number | Country | Date |
|--------|---------|------|
| 313,136 | Germany | July 4, 1919 |